United States Patent
Miyano et al.

(10) Patent No.: US 9,085,731 B2
(45) Date of Patent: Jul. 21, 2015

(54) METHODS FOR PRODUCING LIGHT-EMITTING BODY CONTAINING SILICON FINE PARTICLES AND LIGHT-EMITTING SILICON FINE PARTICLES

(75) Inventors: Mari Miyano, Nishitokyo (JP);
Yoshinori Iwabuchi, Akishima (JP);
Shinobu Endou, Fuchu (JP); Shingo Oono, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 128 days.

(21) Appl. No.: 13/634,310

(22) PCT Filed: Mar. 11, 2011

(86) PCT No.: PCT/JP2011/055808
§ 371 (c)(1),
(2), (4) Date: Oct. 31, 2012

(87) PCT Pub. No.: WO2011/111830
PCT Pub. Date: Sep. 15, 2011

(65) Prior Publication Data
US 2013/0037514 A1   Feb. 14, 2013

(30) Foreign Application Priority Data

Mar. 12, 2010 (JP) .................. 2010-055670
Apr. 7, 2010 (JP) .................. 2010-088614

(51) Int. Cl.
*C03C 15/00* (2006.01)
*C09K 11/59* (2006.01)
*C09K 11/02* (2006.01)

(52) U.S. Cl.
CPC ............... *C09K 11/59* (2013.01); *C09K 11/025* (2013.01)

(58) Field of Classification Search
USPC .......................................... 216/24
See application file for complete search history.

(56) References Cited

U.S. PATENT DOCUMENTS 3,660,298 A    5/1972   McClincy et al.
5,824,601 A *  10/1998  Dao et al. ............... 438/713
(Continued)

FOREIGN PATENT DOCUMENTS

JP    50-008015 B    4/1975
JP    2007-112656 A  5/2007
(Continued)

OTHER PUBLICATIONS wordiQ.com, Yield (chemistry), Mar. 17, 2014, WordiQ.com p. 1-2.*
(Continued)

*Primary Examiner* — Binh X Tran
*Assistant Examiner* — David Cathey, Jr.
(74) *Attorney, Agent, or Firm* — Sughrue Mion, PLLC (57) ABSTRACT

The present invention is a method for producing a light-emitting body containing silicon fine particles that emit visible light, comprising: a baking step of baking a mixture containing a silicon source and a carbon source in an inert atmosphere; a rapid cooling step of rapidly cooling a gas generated by baking the mixture to obtain a composite powder; and a removing step of removing a portion of the composite powder, wherein in the removing step, a portion of silicon monoxide and a portion of silicon dioxide are removed from the composite powder containing silicon fine particles, silicon monoxide, and silicon dioxide.

10 Claims, 8 Drawing Sheets

(56) References Cited

U.S. PATENT DOCUMENTS

| | | | |
|---|---|---|---|
| 7,795,805 B2* | 9/2010 | Kim | 313/504 |
| 2003/0134470 A1* | 7/2003 | Ema | 438/254 |
| 2008/0131694 A1* | 6/2008 | Sato et al. | 428/338 |
| 2009/0263659 A1 | 10/2009 | Goan et al. | |

FOREIGN PATENT DOCUMENTS

| | | | |
|---|---|---|---|
| JP | 2007-246329 A | 9/2007 | |
| JP | 2009-132872 A | 6/2009 | |
| JP | 2009132872 A | * 6/2009 | |
| WO | 2008/032619 A1 | 3/2008 | |
| WO | 2009/060820 A1 | 5/2009 | |

OTHER PUBLICATIONS

JPO, JP2009-132872A translation, Mar. 17, 2014, JPOp.1-10.*
Extended European Search Report in corresponding EP 11753488.3 dated Apr. 14, 2014 (5 pages).

* cited by examiner

METHODS FOR PRODUCING LIGHT-EMITTING BODY CONTAINING SILICON FINE PARTICLES AND LIGHT-EMITTING SILICON FINE PARTICLES

CROSS REFERENCE TO RELATED APPLICATIONS

This application is a National Stage of International Application No. PCT/JP2011/055808, filed on Mar. 11, 2011, which claims priority from Japanese Patent Application Nos. 2010-055670, filed Mar. 12, 2010 and JP 2010-088614, filed Apr. 7, 2010, the contents of all of which are incorporated herein by reference in their entirety.

TECHNICAL FIELD

The present invention relates to a method for producing a light-emitting body containing silicon fine particles that emit visible light. Moreover, the present invention relates to a method for producing light-emitting silicon fine particles that emit visible light.

BACKGROUND ART

Recently, with the advance in nanotechnology, a raw-material powder is sought to have a smaller particle size. The target of research and development is shifting from submicron particles to nanoparticles. Particularly, nanoparticles of 20 nm or smaller are known to demonstrate a peculiar electromagnetic effect along with change in an electronic state and also to have excellent properties, which a bulk material does not have, owing to an increased percentage of surface atoms and so on. For this reason, for example, silicon fine particles are expected to be used for a light-emitting element and other applications.

As a method for producing light-emitting silicon fine particles that have properties to emit visible light, a production method described in Patent Document 1 is known. In this production method, a mixture containing a silicon source and a carbon source is baked in an inert atmosphere. A reaction gas generated by the baking is rapidly cooled to obtain a composite powder of silicon (Si), silicon monoxide (SiO), and silicon dioxide ($SiO_2$). The obtained composite powder is immersed in an etching solution containing hydrofluoric acid and an oxidant. Thus, light-emitting silicon fine particles are produced.

PRIOR ART DOCUMENT

Patent Document

Patent Document 1: Japanese Patent Application Publication No. 2009-1332872

SUMMARY OF THE INVENTION

In the production method of Patent Document 1, the etching solution containing hydrofluoric acid and an oxidant is used to dissolve silicon monoxide and silicon dioxide contained in the composite powder. The silicon fine particles remained undissolved are filtered to thus obtain light-emitting silicon fine particles. However, the etching solution containing hydrofluoric acid and an oxidant dissolves not only silicon monoxide and silicon dioxide, but also the silicon fine particles. As a result, the yield of light-emitting silicon fine particles is low, and the silicon fine particles contained in the composite powder cannot be utilized sufficiently. In order to reduce the production cost, there is demanded a method for producing a light-emitting body which effectively utilizes silicon fine particles contained in a composite powder.

Accordingly, the present invention has been made in view of such a circumstance. An object of the present invention is to provide a method for producing a light-emitting body containing silicon fine particles at a low production cost by effectively utilizing silicon fine particles contained in a composite powder.

Solution to Problem

In order to solve the objective described, as a result of diligent study by the inventors of the present invention, the inventors completed the present invention with the following features. The feature of the present invention is summarized as a method for producing a light-emitting body containing silicon fine particles that emit visible light, comprising: a baking step of baking a mixture containing a silicon source and a carbon source in an inert atmosphere; a rapid cooling step of rapidly cooling a gas generated by baking the mixture to obtain a composite powder; and a removing step of removing a portion of the composite powder, wherein in the removing step, a portion of silicon monoxide and a portion of silicon dioxide are removed from the composite powder containing silicon fine particles, silicon monoxide, and silicon dioxide.

According to the features of the present invention, in the removing step, a portion of silicon monoxide and a portion of silicon dioxide are removed from the composite powder containing silicon fine particles, silicon monoxide (SiO), and silicon dioxide ($SiO_2$). Removing only a portion of the silicon monoxide and a portion of the silicon dioxide suppresses a loss of the silicon fine particles contained in the composite powder. Thus, this makes it possible to effectively utilize the silicon fine particles contained in the composite powder.

BRIEF DESCRIPTION OF DRAWINGS

FIG. 3($a$) is a graph showing fluorescence spectra of light-emitting bodies containing silicon fine particles according to Examples and light-emitting silicon fine particles according to Comparative Example. FIG. 3($b$) is a graph for comparing peak intensities of emission intensities in FIG. 3($a$).

DESCRIPTION OF EMBODIMENTS

In the following description of the drawings, same or similar reference signs denote same or similar elements and portions. It should be noted that the drawings are schematic and ratios of dimensions and the like are different from actual ones. Therefore, specific dimensions and the like should be determined in consideration of the following description. The drawings also include portions having different dimensional relationships and ratios from each other.

First Embodiment

An example of a light-emitting body containing silicon fine particles of a first embodiment according to the present invention will be described with reference to the drawings. Specifically, descriptions are given of (1) Schematic Configuration Of Production Apparatus 1 Used For Light-Emitting Body Containing Silicon Fine Particles, (2) Method For Producing Light-Emitting Silicon Fine Particles, (3) Properties Of Light-Emitting Silicon Fine Particles, (4) Examples, and (5) Operations and Effects.

Figure 1:
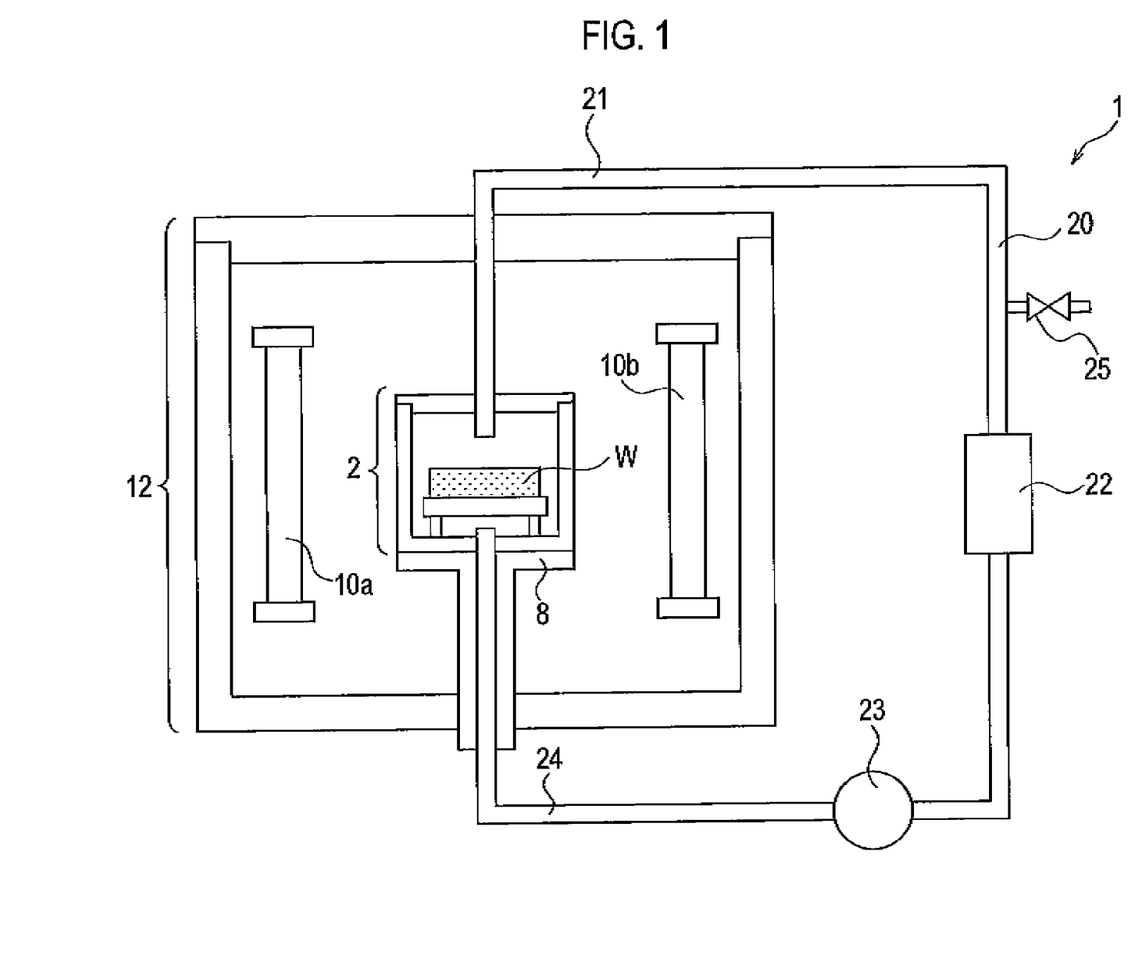
FIG. 1 is a schematic configuration diagram of a production apparatus 1 used for a light-emitting body containing silicon fine particles according to a first embodiment.

(1) Schematic Configuration of Production Apparatus 1 Used for Light-Emitting Body Containing Silicon Fine Particles A schematic configuration of a production apparatus 1 used for the light-emitting body containing silicon fine particles according to the present embodiment will be described with reference to FIG. 1. FIG. 1 is a schematic configuration diagram of the production apparatus 1 used for the light-emitting body containing silicon fine particles according to the present embodiment.

As shown in FIG. 1, the production apparatus 1 includes: a heating enclosure 2 configured to form a heating atmosphere and to house a mixture containing a silicon source and a carbon source in a container W; a stage 8 configured to support the heating enclosure 2; a heater 10a and a heater 10b configured to heat the mixture housed in the container W; an insulator 12 configured to cover the heating enclosure 2, the heater 10a, and the heater 10b; a blower 23 configured to suck a reaction gas from the heating enclosure 2 through a suction pipe 21; a dust collector 22 configured to house a composite powder; and an aspirator 20 having a supply pipe 24 configured to supply a gas. The aspirator 20 is capable of sucking a SiO gas while maintaining the heating and inert atmosphere in the heating enclosure 2. The aspirator 20 is provided so that an argon gas can circulate therein. Moreover, the aspirator 20 includes an electromagnetic valve 25 that automatically opens and closes by a pressure having been set.

Figure 2:
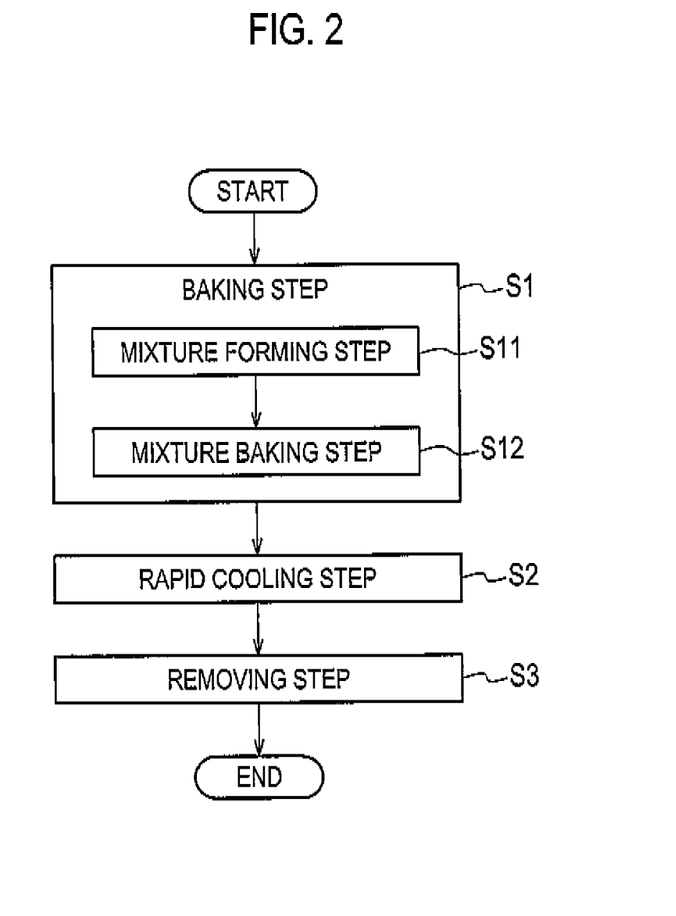
FIG. 2 is a flowchart for explaining a method for producing a light-emitting body containing silicon fine particles according to the first embodiment.

(2) Method for Producing Light-Emitting Body Containing Silicon Fine Particles A method for producing a light-emitting body containing silicon fine particles according to the present embodiment will be described with reference to FIGS. 1 and 2. FIG. 2 is a flowchart for explaining the method for producing a light-emitting body containing silicon fine particles according to the present embodiment. As shown, in FIG. 2, the method for producing a light-emitting body containing silicon fine particles includes steps S1 to S3.

Step S1 is a baking step of baking a mixture containing a silicon source and a carbon source in an inert atmosphere. Step S1 includes: step S11 of forming a mixture of a silicon source and a carbon source; and step S12 of baking the mixture formed in step S11.

As the silicon source, that is, a silicon-containing raw material, a liquid silicon source and a solid silicon source can be used together. Note that at least one liquid silicon source must be selected as the silicon source.

As the liquid silicon source, polymers of tetraalkoxysilanes and alkoxysilanes (mono-, di-, tri-, tetra-) are used. Among the alkoxysilanes, tetraalkoxysilanes are preferably used. Specific examples thereof include methoxysilane, ethoxysilane, propoxysilane, butoxysilane, and the like. From the view of handling, ethoxysilane is preferable. Examples of the polymers of tetraalkoxysilanes include liquid silicon sources of low molecular weight polymers (oligomers) having a degree of polymerization of approximately 2 to 15 and silicic acid polymers having a higher degree of polymerization.

Examples of the solid silicon source usable together with these liquid silicon sources include silicon oxides. Examples of the silicon oxide include, besides SiO, silica sols (colloidal ultrafine silica-containing solution containing an OH group and an alkoxy group therein), silicon dioxide (silica gel, fine silica, quartz powder), and the like.

Among these silicon sources, tetraethoxysilane oligomer, mixtures of tetraethoxysilane oligomer and fine powder silica, and the like are preferable from the viewpoint of homogeneity and handling.

To obtain a high-purity silicon carbide powder, a high-purity substance is preferably used as the silicon source. Specifically, the initial impurity content is preferably 20 ppm or less, further preferably 5 ppm or less.

Note that examples of the impurity include heavy metal elements such as Fe, Ni, Cu, Cr, V, and W; alkali metal elements such as Li, Na, and K; alkaline earth or amphoteric metal elements such as Be, Mg, Ca, B, Al, and Ga; and the like.

The carbon source, that is, a carbon-containing raw material, is synthesized using a catalyst containing no impurity element, and may be a monomer, an oligomer, and a polymer composed of any single or two or more organic compounds curable by heating and/or with the catalyst, or through polymerization or cross-linking with a crosslinker.

Preferable specific examples of the carbon-containing raw material include curable resins such as phenolic resins, furan resins, urea resins, epoxy resins, unsaturated polyester resins, polyimide resins, and polyurethane resins synthesized using a catalyst containing no impurity element. Particularly, resol-type or novolac-type phenolic resins which have a high residual carbon ratio and an excellent workability are preferable.

The resol-type phenolic resins useful in the present embodiment are produced by reacting monovalent or divalent phenols such as phenol, cresol, xylenol, resorcin, or bisphenol A with aldehydes such as formaldehyde, acetaldehyde, or benzaldehyde in the presence of a catalyst containing no impurity element (specifically, ammonia or an organic amine).

The organic amine used as the catalyst may be any of primary, secondary, and tertiary amines. As the organic amine, it is possible to use dimethylamine, trimethylamine, diethylamine, triethylamine, dimethylmonoethanolamine, monomethyldiethanolamine, N-methylaniline, pyridine, morpholine, and the like.

As the method for synthesizing a resol-type phenolic resin by reacting a phenol with an aldehyde in the presence of ammonia or an organic amine, conventionally known methods can be employed, except that a different catalyst is used.

Specifically, 1 to 3 males of the aldehyde and 0.02 to 0.2 moles of the organic amine or ammonia are added to 1 mole of the phenol, followed by heating to 60 to 100° C.

Meanwhile, the novolac-type phenolic resins useful in the present embodiment can be produced by mixing monovalent or divalent phenols and aldehydes as described above for reaction using an acid. (specifically, hydrochloric acid, sulfuric acid, p-toluenesulfonic acid, oxalic acid, or the like) containing no impurity element as a catalyst.

For the production of a novolac-type phenolic resin also, conventionally known methods can be employed. Specifically, 0.5 to 0.9 moles of the aldehyde and 0.02 to 0.2 moles of an inorganic acid or organic acid containing no impurity element are added to 1 mole of the phenol, followed by heating to 60 to 100° C.

In step S11, to the raw material mixture in which the silicon-containing raw material and the carbon-containing raw material are mixed, a crosslinker or a catalyst for polymerization or crass-linking is added as necessary. The resultant is dissolved in a solvent. A polymerization or cross-linking reaction takes place to form the mixture. The raw material mixture is heated at approximately 150° C. Thereby, the mixture is dried. The Si/C ratio is preferably 0.5 to 3.0.

Step S12 is a step of baking the mixture obtained in step S11 in an inert gas atmosphere. The mixture is housed in the container W. Using the heater 10a and the heater 10b, the mixture is carbonized and silicated by heating and baking in an inert gas atmosphere. Thereby, a gas containing carbon and silicon is generated. Specifically, silicon monoxide (SiO) is produced as shown in the following formula (1).

$$SiO_2 + C \rightarrow SiO + CO \tag{1}$$

The inert gas atmosphere is a non-oxidizing atmosphere. The inert gas includes, for example, vacuum, nitrogen, helium or argon.

Next, step S2 is performed. Step S2 is a rapid cooling step of rapidly cooling the gas generated by baking the mixture to obtain a composite powder. The blower 23 is actuated. Then, the generated gas is drawn from the inside of the heating enclosure 2 by argon gas stream through the suction pipe 21. Since the outside of the insulator 12 is maintained at room temperature, the generated gas is rapidly cooled to room temperature. Subsequently, a composite powder containing silicon fine particles (Si) is obtained from the generated gas. Specifically, by cooling at a temperature below 1600° C., the composite powder containing silicon fine particles are obtained as shown in the following formula (2).

$$2SiO \rightarrow Si + SiO_2 \tag{2}$$

Note that since the reaction in the formula (2) does not always completely proceed, the composite powder contains not only Si and $SiO_2$ but also SiO. In other words, the composite powder contains Si and SiOx (x=1 or 2), other than impurities.

The obtained composite powder is collected into the dust collector 22. The argon stream is sent into the heating enclosure 2 through the supply pipe 24.

Next, step S3 is performed. Step S3 is a removing step of removing a portion of the composite powder. The collected composite powder is immersed into a solvent. To the solvent in which the composite powder is immersed, an acid for dissolving silicon monoxide and silicon dioxide is added. Thereby, a portion of silicon monoxide and a portion of silicon dioxide are removed from the composite powder containing silicon fine particles, silicon monoxide, and silicon dioxide. By this removing, a light-emitting body containing silicon fine particles containing silicon, silicon monoxide, and silicon dioxide is obtained. An example of the acid used for the removing includes hydrofluoric acid.

The amount or concentration of the acid is adjusted in accordance with the amount of the composite powder so that the light-emitting body containing silicon fine particles can contain silicon, silicon monoxide, and silicon dioxide. For example, assume that the composite powder is an equimolar mixture of the silicon monoxide and the silicon dioxide. In other words, when the number of moles of the composite powder to be immersed is 2×, the composite powder contains each of SiO and $SiO_2$ in x moles. A minimum necessary amount of the acid to dissolve all of the equimolar mixture is defined as an equivalent amount. The minimum necessary amount of the acid can be calculated using the following formulas (3) and (4).

$$SiO_2 + 6HF \rightarrow H_2SiF_6 + 2H_2O \tag{3}$$

$$SiO + 6HF \rightarrow H_2SiF_6 + H_2O + H_2 \tag{4}$$

By using the acid whose amount is 1 to 99% of the equivalent amount, a portion of the silicon monoxide and a portion of the silicon dioxide contained in the composite powder can be removed. In other words, by controlling the amount of the acid, the thickness of silicon oxide (SiOx) covering the silicon fine particles can be controlled. The amount of the acid used is more preferably 20 to 90% of the equivalent amount. Thereby, a light-emitting body containing silicon fine particles having a certain size and easy to handle is obtained.

Preferably, the acid is added to the solvent over time. For example, the acid is preferably added at a rate of 1 ml or smaller per minute to 10 ml of the solvent. Accordingly, it is possible to slowly remove only the silicon monoxide and the silicon dioxide covering the surface of the silicon fine particles from the outer side. Prom the viewpoint that the reaction of dissolving silicon monoxide and silicon dioxide with an acid is an exothermic reaction and accompanied by bubbling also, the acid is preferably added slowly to the solvent over time with stirring.

Preferably, the composite powder is immersed in a solution containing the acid for 1 hour or longer. This allows sufficient time for the reaction between the acid and the composite powder, and accordingly the silicon monoxide and the silicon dioxide covering the surface of the silicon fine particles can be removed. More preferably, the composite powder is immersed in the solution containing the acid for 48 hours or longer. When 48 hours elapse, the reaction between the acid and the composite powder is completed. Accordingly, the silicon monoxide and the silicon dioxide covering the surface of the silicon fine particles can be removed more surely.

(3) Properties of Light-Emitting Silicon Fine Particles

The properties and usage of a light-emitting body containing silicon fine particles obtained by the method for producing a light-emitting body containing silicon fine particles of the present embodiment are as follow. The light-emitting body containing silicon fine particles has an average particle diameter of 10 nm to 1 μm. In consideration of the emission intensity, the light-emitting body containing silicon fine particles more preferably has an average particle diameter in a range from 10 nm to 500 nm. The light-emitting body containing silicon fine particles emits color by ultraviolet irradiation.

By making use of the properties of fluorescing in the visible region, the light-emitting body containing silicon fine particles can be utilized as, for example, a material of light-emitting elements, particularly a light-emitting material that can be incorporated into a living body because of an advantage that the light-emitting body containing silicon fine particles is non-harmful to human body.

Besides, for example, the light-emitting body containing silicon fine particles can be used for ultraviolet (UV) filter cosmetics and the like other than a material of light-emitting elements. Moreover, by subjecting to surface modification, the light-emitting body containing silicon fine particles can be put into a practical use as a light-emitting marker having various functions.

(4) Examples

Hereinafter, Examples of the present invention will be illustrated. These Examples do not limit the present invention at all.

(4.1) Emission Intensity

To examine the emission intensity of the light-emitting body containing silicon fine particles according to the present embodiment, the following experiments were conducted.

Figure 3:
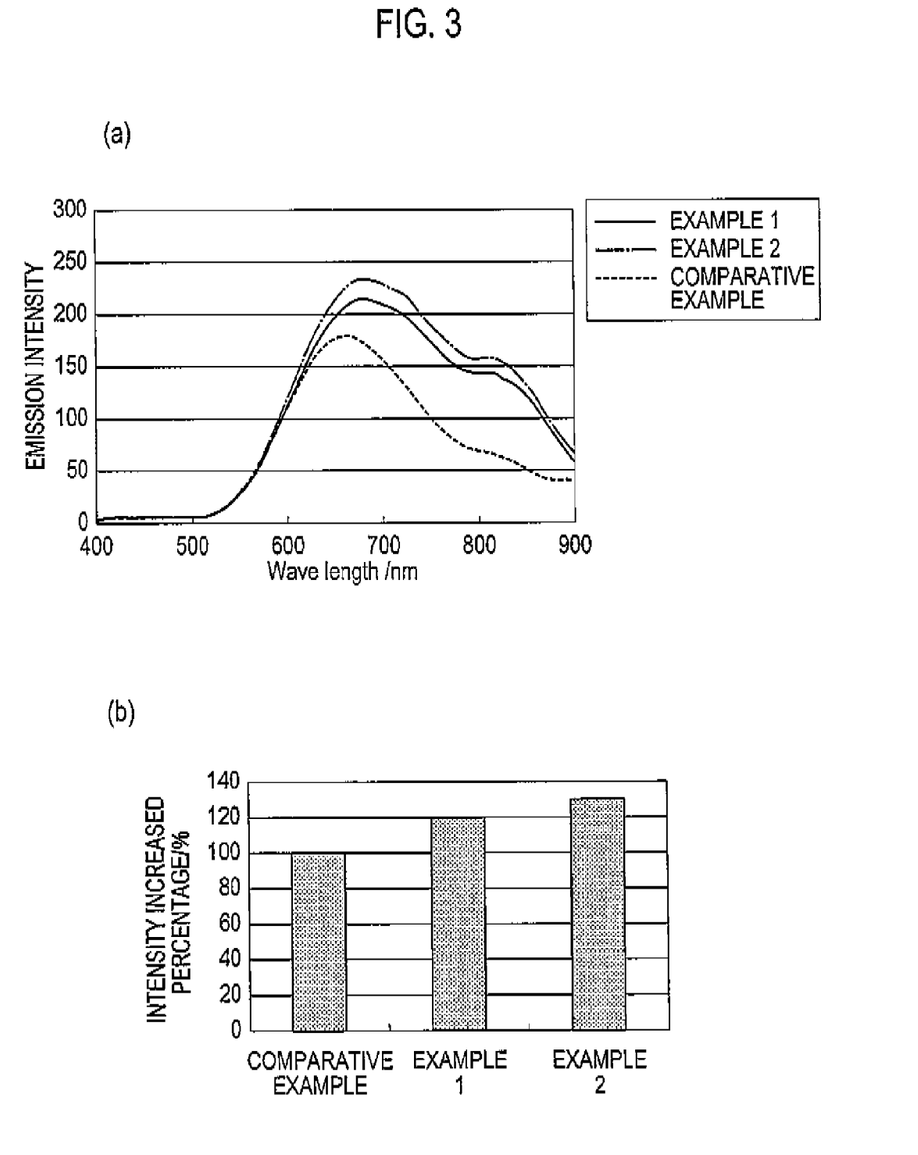

A mixture solution containing 620 g of ethyl silicate as the silicon source, 288 g of a phenolic resin as the carbon source, and 92 g (35 wt %) of an aqueous solution of maleic acid as the polymerization catalyst was placed in the heating enclosure 2 in FIG. 3. The mixture solution was heated at 150° C. and solidified. Next, the resultant mixture was carbonized in a nitrogen atmosphere at 90° C. for 1 hour. The obtained carbide was heated in an argon atmosphere at 1600° C.

Next, a reaction gas generated in the heating enclosure 2 was transferred to the outside of the heating enclosure 2 using the aspirator 20 and an argon gas as a carrier gas, followed by rapid cooling to obtain a composite powder.

Into 5 ml of the solvent (ethanol), 2 g of the obtained composite powder was immersed. To the solvent in which the composite powder was immersed, only 2 ml of hydrofluoric acid (HF) was added (Example 1). Similarly, 2 g of the composite powder was immersed into 5 ml of the solvent (ethanol). To the solvent in which the composite powder was immersed, only 5 ml of hydrofluoric acid (HF) was added (Example 2). The solutions to which hydrofluoric acid had been added were left standing for 5 days. Then, each of the solutions was filtered using a 0.1-μm filter. Thus, light-emitting bodies containing silicon fine particles of the present embodiment were obtained.

Note that 1.13 g of SiO and 0.87 g of $SiO_2$ are contained in 2 g of the composite powder through calculation that the molecular weight of SiO is 44 and the molecular weight of $SiO_2$ is 60, provided that the 2 g composite powder is an equimolar mixture of silicon monoxide and silicon dioxide. The minimum necessary amount of hydrofluoric acid to dissolve all of the equimolar mixture was 10.5 ml (containing 0.27 mol of hydrogen fluoride).

For comparison, the composite powder was etched but not subjected to the removing step. To 2 g of the composite powder, 5 ml of ethanol was added. Further, 38 wt % of hydrofluoric acid and 68 wt % of nitric acid were added. The solution was filtered to obtain silicon fine particles (Comparative Example 1).

The obtained light-emitting bodies containing silicon fine particles (Examples 1 and 2) and the etched silicon fine particles (Comparative Example 1) were irradiated with ultraviolet radiation having a wavelength of 365 nm. FIGS. 3(a) and 3(b) show the result. FIG. 3(a) is a graph showing fluorescence spectra of the light-emitting bodies containing silicon fine particles according to Examples and the light-emitting silicon fine particles according to Comparative Example. FIG. 3(b) is a graph for comparing peak intensities of emission intensities in FIG. 3(a).

As shown in FIG. 3(a), it can be seen that the emission intensities in the range from 600 nm to 900 nm in Examples 1 and 2 are higher than that in Comparative Example 1. Specifically, in FIG. 3(b), let the peak intensity of the emission intensity in Comparative Example be 100. The peak intensity in Example 1 was higher than that in Comparative Example by 20%. The peak intensity in Example 2 was higher than that in Comparative Example by 30%.

In comparison between Examples 1 and 2, the emission intensity in Example 2 is higher. One cause of this is presumably that since the layer of the silicon monoxide and the silicon dioxide covering the silicon fine particles was thinner in Example 2, a larger amount of ultraviolet light reached the silicon fine particles.

From the above, the result thus obtained showed that the light-emitting body containing silicon fine particles according to the present embodiment has a higher emission intensity than that of the light-emitting silicon fine particles obtained by etching.

Note that a composite powder not subjected to the removing step and etching was similarly irradiated with ultraviolet radiation having a wavelength of 365 nm. However, no light emission was observed therefrom.

(4.2) XRD Analysis

An XRD analysis was performed on the light-emitting body containing silicon fine particles according to the present embodiment.

To 10 ml of a solvent containing ethanol and pure water ($H_2O$), 4 g of a composite powder obtained by the same operation as described above was added. To the solvent to which the composite powder was added, hydrofluoric acid (HF) was added dropwise little by little over time. The amount was 15 ml in total. Specifically, HF was added dropwise at a rate of approximately 1 ml per minute. The amount added dropwise, 15 ml, corresponds to 75 of the equivalent amount. After the dropwise addition, the solution was left standing for 3 days. Then, the solution was filtered using a 0.1-μm filter. Thus, a light-emitting body containing silicon fine particles of the present embodiment was obtained (Example 3).

Figure 4:
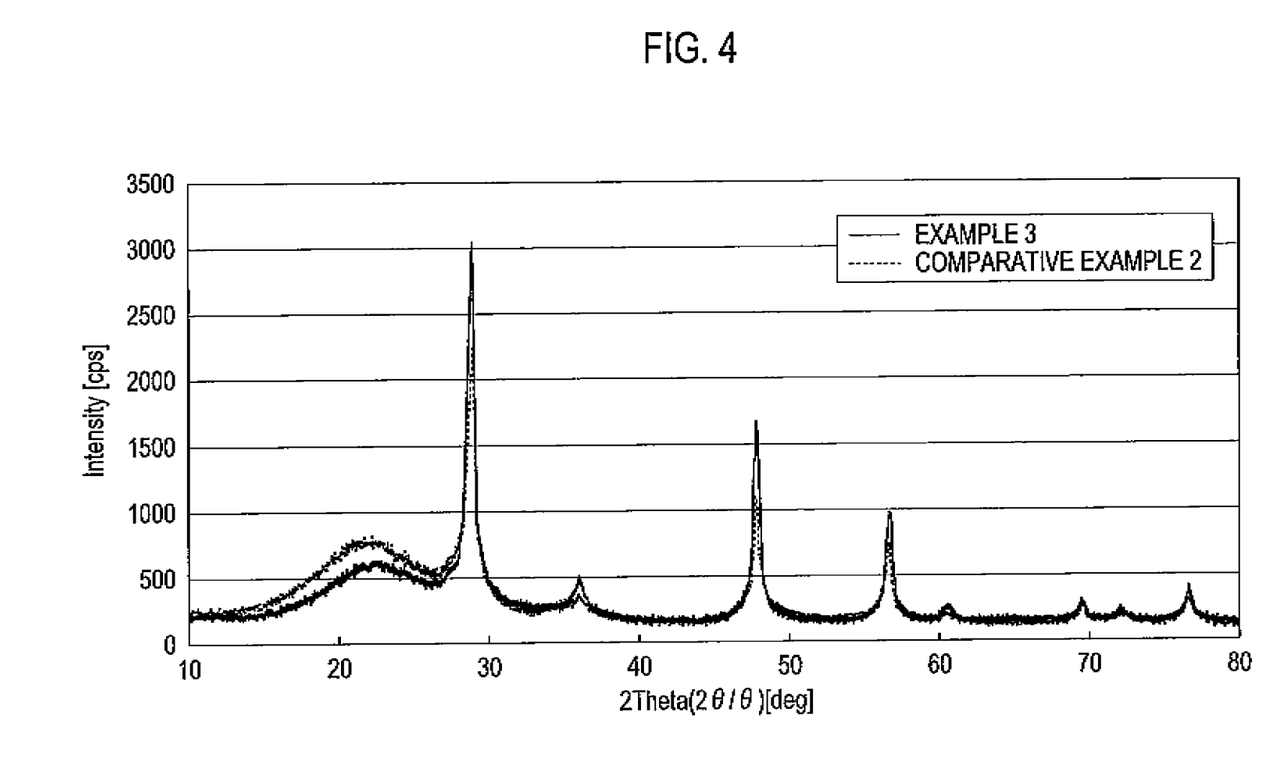
FIG. 4 is a graph showing the XRD result of a light-emitting body containing silicon fine particles according to Example and a composite powder according to Comparative Example.

The obtained light-emitting body containing silicon fine particles (Example 3) was analyzed by XRD. For comparison, the composite powder was also analyzed by XRD (Comparative Example 2). As the XRD instrument, MXP3AHF (Mac Science) was used. The measurement conditions were: CuKα radiation (1.54 Å); accelerating voltage, 40 kV; current, 40 mA; scanning axes, 2θ/θ; range, 10 to 80 deg; step, 0.02 deg; and speed, 1 deg/min. FIG. 4 shows the result.

From FIG. 4, the peak (20 to 24 deg) of silicon dioxide ($SiO_2$) and the peaks (28 to 29, 47 to 48, 56 to 57 deg) of silicon (Si) can be observed. The $SiO_2$ peak was lower in Example 3 in which the removing step was performed than in Comparative Example 2. Thus, in Example 3, the percentage of $SiO_2$ is low. Meanwhile, the Si peak was higher in Example 3 than in Comparative Example 2. Thus, the percentage of Si was increased.

The above results revealed that performing the removing step on the composite powder decreases the $SiO_2$ percentage but relatively increases the Si (silicon fine particles) percentage.

(4.3) Relationship Between Acid Amount and Amount Remained Undissolved

To confirm whether a portion of the silicon monoxide and a portion of the silicon dioxide contained in the composite powder can be removed by controlling the amount of the acid, the following experiments were conducted.

A composite powder was obtained by the same operation as described above. Four samples were prepared each by adding 2 g of the obtained composite powder to the solvent (ethanol, 5 ml). To each sample, hydrofluoric acid was added by 2 ml (Example 4), 5 ml (Example 5), 10 ml (Example 6), or 13 ml (Comparative Example 3), and left standing for 5 days. Then, the solutions of Examples were each filtered using a 0.1-µm filter. The solution of Comparative Example was filtered using a 0.025-µm filter. The amount remained undissolved on the filter was measured, and the solubility was obtained. The solubility was calculated by amount remained undissolved [g]/composite powder [g]. Table 1 and FIG. 5 show the result.

TABLE 1

| | HF amount (ml) | Amount remained undissolved (g) | Solubility (%) |
|---|---|---|---|
| Example 4 | 2 | 1.54 | 23.0 |
| Example 5 | 5 | 0.97 | 51.5 |
| Example 6 | 10 | 0.073 | 96.4 |
| Comparative Example 3 | 13 | 0.057 | 97.2 |

Figure 5:
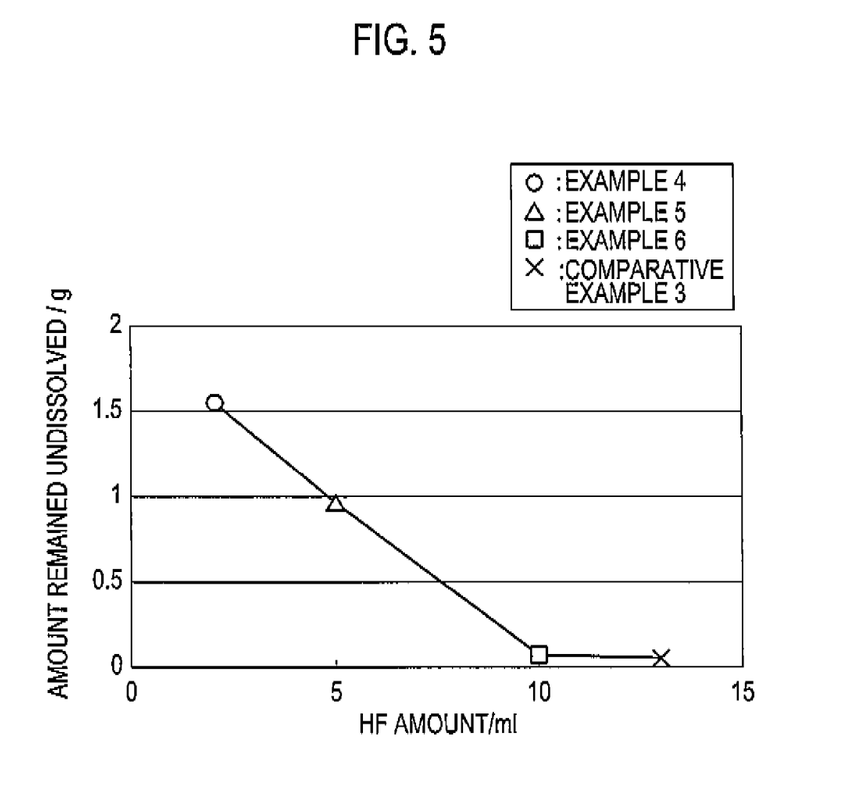
FIG. 5 is a graph showing a relationship between an amount of hydrofluoric acid added and an amount remained undissolved.

As shown in Table 1 and FIG. 5, it can be seen that when silicon monoxide and silicon dioxide are removed with hydrofluoric acid whose amount is smaller than the equivalent amount of 10.5 ml for 2 g of the composite powder, the amount remained undissolved is decreased in proportion to the amount of hydrofluoric acid added. This revealed that a desired light-emitting body containing silicon fine particles is obtained by controlling the amount or concentration of the acid in accordance with the amount of the composite powder.

(5) Operations and Effects

Before the removing step is performed, the composite powder does not emit light even when irradiated with ultraviolet light. The reasons are inferred as follow. Specifically, the silicon monoxide and the silicon dioxide covering the silicon fine particles are too thick. Additionally, ultraviolet light is diffusely reflected at asperities on the covering surfaces of the silicon monoxide and the silicon dioxide. Hence, ultraviolet light does not reach or hardly reaches the silicon fine particles.

The method for producing a light-emitting body containing silicon fine particles according to the present embodiment includes: a baking step of baking a mixture containing a silicon source and a carbon source in an inert atmosphere; a rapid cooling step of rapidly cooling a gas generated by baking the mixture to obtain a composite powder; and a removing step of removing a portion of the composite powder. In the removing step, a portion of silicon monoxide and a portion of silicon dioxide are removed from the composite powder containing silicon fine particles, silicon monoxide, and silicon dioxide. Accordingly, the layer of the silicon monoxide and the silicon dioxide covering the silicon fine particles is made thin. In addition, the asperities on the surfaces are also reduced. Thus, it is speculated that ultraviolet light reaches the silicon fine particles, and the light-emitting body containing silicon fine particles emits light.

Removing only a portion of the silicon monoxide and a portion of the silicon dioxide suppresses a loss of the silicon fine particles contained in the composite powder. Thus, this makes it possible to effectively utilize the silicon fine particles contained in the composite powder. Since the silicon fine particles contained in the composite powder can be effectively utilized, a large amount of the light-emitting body is obtained in the light-emitting body containing silicon fine particles in comparison with light-emitting silicon fine particles even when the same amount of the composite powder is used. Hence, a reduction in the production cost is achieved.

Since a portion of silicon monoxide and a portion of silicon dioxide are removed from the composite powder containing silicon fine particles, silicon monoxide, and silicon dioxide, the light-emitting body containing silicon fine particles contains not only silicon fine particles, but also silicon monoxide and silicon dioxide. Hence, the light-emitting body containing silicon fine particles is larger than nano-size silicon fine particles, and the handling is easy.

Silicon fine particles not covered with silicon monoxide and silicon dioxide are subjected to surface oxidation. Moreover, etching to remove silicon monoxide and silicon dioxide causes H atoms to be partially added to the silicon fine particles. Accordingly, silicon fine particles are made hydrophobic and are likely to aggregate in an aqueous solution. For this reason, an unsaturated hydrocarbon group having a hydrophilic group on the surface thereof is introduced to the silicon fine particles for stabilization.

The light-emitting body containing silicon fine particles stably exists, since covered with silicon monoxide and silicon dioxide. Thus, a substituting step for partially adding H atoms does not need to be performed. Accordingly, a reduction in the production cost is achieved.

In the method for producing a light-emitting body containing silicon fine particles according to the present embodiment, in the removing step, a portion of the composite powder is dissolved using an acid for dissolving silicon monoxide and silicon dioxide. Further, in the method for producing a light-emitting body containing silicon fine particles according to the present embodiment, the acid is hydrofluoric acid. Accordingly, the silicon monoxide and the silicon dioxide can be suitably removed.

In the method for producing a light-emitting body containing silicon fine particles according to the present embodiment, an amount of the acid used in the removing step is 1 to 99% of an equivalent amount, where the equivalent amount is a minimum amount of the acid necessary to dissolve all of an equimolar mixture of the silicon monoxide and the silicon dioxide when the composite powder is assumed to be the equimolar mixture. Accordingly, a portion of the silicon monoxide and a portion of the silicon dioxide contained in the composite powder can be removed. In other words, a removal amount of the silicon oxide (SiOx) covering the silicon fine particles can be controlled by controlling the amount of the acid.

In the method for producing a light-emitting body containing silicon fine particles according to the present embodiment, the composite powder is immersed into a solvent, and an acid is added to the solvent at a rate of 1 ml or smaller per minute. Accordingly, it is possible to slowly remove only the silicon monoxide and the silicon dioxide covering the surface of the silicon fine particles from the outer side. From the viewpoint that the reaction of dissolving silicon monoxide and silicon dioxide with an acid is an exothermic reaction and accompanied by bubbling also, the acid is preferably added slowly to the solvent over time with stirring.

In the method for producing a light-emitting body containing silicon fine particles according to the present embodiment, in the removing step, the composite powder is immersed in a solution containing the acid for 1 hour or longer. Accordingly, this allows sufficient time for the reaction between the acid and the composite powder, and thus the silicon monoxide and the silicon dioxide covering the surface of the silicon fine particles can be removed.

The present invention has been described by way of the embodiment described above. However, it should not be understood that the description and drawings which constitute part of this disclosure limit the present invention. From this disclosure, various alternative embodiments, Examples, and operation techniques will be easily found by those skilled in the art. The present invention includes various embodiments which are not described herein. Accordingly, the technical scope of the present invention should be determined only by the matters to define the invention in the scope of claims regarded as appropriate based on the description.

Second Embodiment

Recently, with the advance in nanotechnology, a raw-material powder is sought to have a smaller particle size. The target of research and development is shifting from submicron particles to nanoparticles. Particularly, nanoparticles of 20 nm or smaller are known to demonstrate a peculiar electromagnetic effect along with change in an electronic state and also to have excellent properties, which a bulk material does not have, owing to an increased percentage of surface atoms and so on. For this reason, for example, silicon fine particles are expected to be used for a light-emitting element and other applications.

As a method for producing light-emitting silicon fine particles that have properties to emit visible light, the aforementioned production method described in Patent Document 1 (Japanese Patent Application Publication No. 2009-132872) is known. In this production method, a mixture containing a silicon source and a carbon source is baked in an inert atmosphere. A reaction gas generated by the baking is rapidly cooled to obtain a composite powder of silicon (Si), silicon monoxide (SiO), and silicon dioxide ($SiO_2$). The obtained composite powder is immersed into an etching solution containing hydrofluoric acid and an oxidant to etch the silicon monoxide and the silicon dioxide. Then, the solution is filtered. In this manner, light-emitting silicon fine particles are produced.

In the production method of Patent Document 1, the etching solution etches not only silicon monoxide and silicon dioxide, but also silicon fine particles. Since the emission peak of silicon fine particles varies according to the particle size, the particle size of silicon fine particles has to be controlled. However, silicon fine particles cannot be obtained unless silicon monoxide and silicon dioxide are etched, and the particle size of silicon fine particles is controlled only to a limited extent. Consequently, silicon fine particles having desired light-emitting properties are not obtained in some cases.

Moreover, etching forms silicon fine particles having a particle diameter smaller than the pore size of a filter material, consequently decreasing the yield of silicon fine particles.

Accordingly, the present invention has been made in view of such circumstances. An object of the present invention is to provide a method for producing light-emitting silicon fine particles, capable of producing light-emitting silicon fine particles having desired light-emitting properties in a high yield by controlling the particle size of silicon fine particles.

An example of light-emitting silicon fine particles of a second embodiment according to the present invention will be described with reference to the drawings. Specifically, descriptions are given of (1) Schematic Configuration Of Production Apparatus 1 Used For Light-Emitting Silicon Fine Particles, (2) Method For Producing Light-Emitting Silicon Fine Particles, (3) Properties Of Light-Emitting Silicon Fine Particles, (4) Comparative Evaluation, and (5) Operations and Effects.

Figure 6:
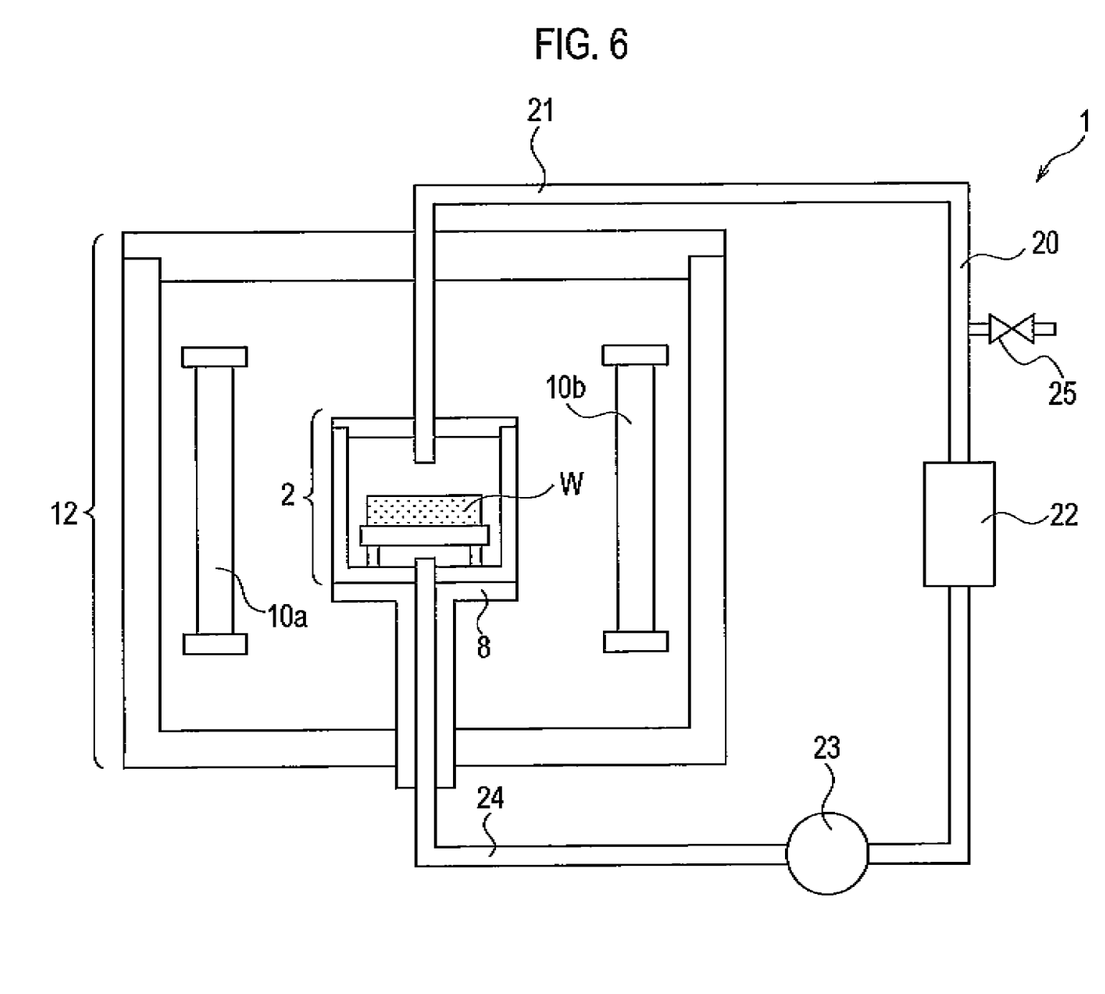
FIG. 6 is a schematic configuration diagram of a production apparatus 1 used for light-emitting silicon fine particles according to a second embodiment.

(1) Schematic Configuration of Production Apparatus 1 Used for Light-Emitting Silicon Fine Particles A schematic configuration of a production apparatus 1 used for the light-emitting silicon fine particles according to the present embodiment will be described with reference to FIG. 6. FIG. 6 is a schematic configuration diagram of the production apparatus 1 used for the light-emitting silicon fine particles according to the present embodiment.

As shown in FIG. 6, the production apparatus 1 includes: a heating enclosure 2 configured to form a heating atmosphere and to house a mixture containing a silicon source and a carbon source in a container W; a stage 8 configured to support the heating enclosure 2; a heater 10a and a heater 10b configured to heat the mixture housed in the container W; an insulator 12 configured to cover the heating enclosure 2, the heater 10a, and the heater 10b; a blower 23 configured to suck a reaction gas from the heating enclosure 2 through a suction pipe 21; a dust collector 22 configured to house a first composite powder; and an aspirator 20 having a supply pipe 24 configured to supply a gas. The aspirator 20 is capable of sucking a SiO gas while maintaining the heating and inert atmosphere in the heating enclosure 2. The aspirator 20 is provided so that an argon gas can circulate therein. Moreover, the aspirator 20 includes an electromagnetic valve 25 that automatically opens and closes by a pressure having been set.

(2) Method Par Producing Light-Emitting Silicon Fine Particles

Figure 7:
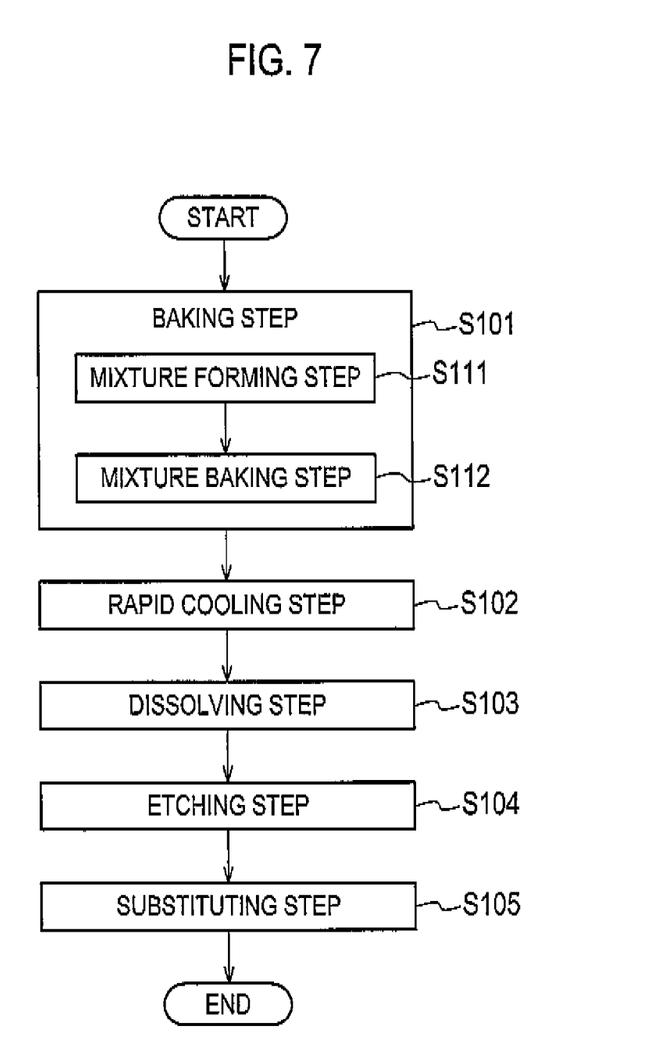
FIG. 7 is a flowchart for explaining a method for producing light-emitting silicon fine particles according to the second embodiment.

A method for producing light-emitting silicon fine particles according to the present embodiment will be described with reference to FIGS. 6 and 7. FIG. 7 is a flowchart for explaining the method for producing light-emitting silicon fine particles according to the present embodiment. As shown in FIG. 7, the method for producing light-emitting silicon fine particles includes steps S101 to S105.

Step S101 is a baking step of baking a mixture containing a silicon source and a carbon source in an inert atmosphere. Step S101 includes; step S111 of forming a mixture of a silicon source and a carbon source; and step S112 of baking the mixture formed in step S111.

As the silicon source, that is, a silicon-containing raw material, a liquid silicon source and a solid silicon source can be used together. Note that at least one liquid silicon source must be selected as the silicon source.

As the liquid silicon source, polymers of tetraalkoxysilanes and alkoxysilanes (mono-, di-, tri-, tetra-) are used. Among the alkoxysilanes, tetraalkoxysilanes are preferably used. Specific examples thereof include methoxysilane, ethoxysilane, propoxysilane, butoxysilane, and the like. From the view of handling, ethoxysilane is preferable. Examples of the polymers of tetraalkoxysilanes include liquid silicon sources of low molecular weight polymers (oligomers) having a degree of polymerization of approximately 2 to 15 and silicic acid polymers having a higher degree of polymerization.

Examples of the solid silicon source usable together with these liquid silicon sources include silicon oxides. Examples of the silicon oxide include, besides SiO, silica sols (colloidal ultrafine silica-containing solution containing an OH group and an alkoxy group therein), silicon dioxide (silica gel, fine silica, quartz powder), and the like.

Among these silicon sources, tetraethoxysilane oligomer, mixtures of tetraethoxysilane oligomer and fine powder silica, and the like are preferable from the viewpoint of homogeneity and handling.

To obtain a high-purity silicon carbide powder, a high-purity substance is preferably used as the silicon source. Specifically, the initial impurity content is preferably 20 ppm or less, further preferably 5 ppm or less.

Note that examples of the impurity include heavy metal elements such as Fe, Ni, Cu, Cr, V, and W; alkali metal elements such as Li, Na, and K; alkaline earth or amphoteric metal elements such as Be, Mg, Ca, B, Al, and Ga; and the like.

The carbon source, that is, a carbon-containing raw material, is synthesized using a catalyst containing no impurity element, and may be a monomer, an oligomer, and a polymer composed of any single or two or more organic compounds curable by heating and/or with the catalyst, or through polymerization or cross-linking with a crosslinker.

Preferable specific examples of the carbon-containing raw material include curable resins such as phenolic resins, furan resins, urea resins, epoxy resins, unsaturated polyester resins, polyimide resins, and polyurethane resins synthesized using a catalyst containing no impurity element. Particularly, resol-type or novolac-type phenolic resins which have a high residual carbon ratio and an excellent workability are preferable.

The resol-type phenolic resins useful in the present embodiment are produced by reacting monovalent or divalent phenols such as phenol, cresol, xylenol, resorcin, or bisphenol A with aldehydes such as formaldehyde, acetaldehyde, or benzaldehyde in the presence of a catalyst containing no impurity element (specifically, ammonia or an organic amine).

The organic amine used as the catalyst may be any of primary, secondary, and tertiary amines. As the organic amine, it is possible to use dimethylamine, trimethylamine, diethylamine, triethylamine, dimethylmonoethanolamine, monomethyldiethanolamine, N-methylaniline, pyridine, morpholine, and the like.

As the method for synthesizing a resol-type phenolic resin by reacting a phenol with an aldehyde in the presence of ammonia or an organic amine, conventionally known methods can be employed, except that a different catalyst is used.

Specifically, 1 to 3 moles of the aldehyde and 0.02 to 0.2 moles of the organic amine or ammonia are added to 1 mole of the phenol, followed by heating to 60 to 100° C.

Meanwhile, the novolac-type phenolic resins useful in the present embodiment can be produced by mixing monovalent or divalent phenols and aldehydes as described above for reaction using an acid (specifically, hydrochloric acid, sulfuric acid, p-toluenesulfonic acid, oxalic acid, or the like) containing no impurity element as a catalyst.

For the production of a novolac-type phenolic resin also, conventionally known methods can be employed. Specifically, 0.5 to 0.9 moles of the aldehyde and 0.02 to 0.2 moles of an inorganic acid or organic acid containing no impurity element are added to 1 mole of the phenol, followed by heating to 60 to 100° C.

In step S111, to the raw material mixture in which the silicon-containing raw material and the carbon-containing raw material are mixed, a crosslinker or a catalyst for polymerization or cross-linking is added as necessary. The resultant is dissolved in a solvent. A polymerization or cross-linking reaction takes place to form the mixture. The raw material mixture is heated at approximately 150° C. Thereby, the mixture is dried. The Si/C ratio is preferably 0.5 to 3.0.

Step S112 is a step of baking the mixture obtained in step S111 in an inert gas atmosphere. The mixture is housed in the container W. Using the heater 10a and the heater 10b, the mixture is carbonized and silicated by heating and baking in an inert gas atmosphere. Thereby, a gas containing carbon and silicon is generated. Specifically, silicon monoxide (SiO) is produced as shown in the following formula (1).

$$SiO_2 + C \;\; SiO + CO \tag{1}$$

The inert gas atmosphere is a non-oxidizing atmosphere. The inert gas includes, for example, vacuum, nitrogen, helium or argon.

Next, step S102 is performed. Step S102 is a rapid cooling step of rapidly cooling the gas generated by baking the mixture to obtain a first composite powder. The blower 23 is actuated. Then, the generated gas is drawn from the inside of the heating enclosure 2 by argon gas stream through the suction pipe 21. Since the outside of the insulator 12 is maintained at room temperature, the generated gas is rapidly cooled to room temperature. Subsequently, a first composite powder containing silicon fine particles (Si) is obtained from the generated gas. Specifically, by cooling at a temperature below 1600° C., the first composite powder containing silicon fine particles is obtained as shown in the following formula (2).

$$2SiO \rightarrow Si + SiO_2 \tag{2}$$

Note that since the reaction in the formula (2) does not always completely proceed, the first composite powder contains not only Si and $SiO_2$ but also SiO. In other words, the first composite powder contains Si and SiOx (x=1 or 2), other than impurities.

The obtained first composite powder is collected into the dust collector 22. The argon stream is sent into the heating enclosure 2 through the supply pipe 24.

Next, step S103 is performed. Step S103 is a dissolving step of dissolving the first composite powder to obtain a second composite powder. The collected first composite powder is immersed into a solvent. To the solvent in which the first composite powder is immersed, an acid for dissolving silicon monoxide and silicon dioxide is added. Thereby, a second composite powder containing silicon, silicon monoxide, and silicon dioxide is obtained. An example of the acid includes hydrofluoric acid.

The amount or concentration of the acid is adjusted in accordance with the amount of the first composite powder so that the second composite powder can contain silicon, silicon monoxide, and silicon dioxide. For example, assume that the first composite powder is an equimolar mixture of the silicon monoxide and the silicon dioxide. In other words, when the number of moles of the first composite powder to be immersed is 2x, the first composite powder contains each of SiO and $SiO_2$ in x moles. A minimum amount of the acid necessary to dissolve all of the equimolar mixture is defined as an equivalent amount. The minimum necessary amount of the acid can be calculated using the following formulas (3) and (4).

$$SiO_2 + 6HF \rightarrow H_2SiF_6 + 2H_2O \tag{3}$$

$$SiO + 6HF \rightarrow H_2SiF_6 + H_2O + H_2 \tag{4}$$

By using the acid whose amount is 1 to 99% of the equivalent amount, a portion of the silicon monoxide and a portion of the silicon dioxide contained in the first composite powder are dissolved. Thus, the second composite powder containing silicon, silicon monoxide, and silicon dioxide is obtained.

Preferably, the acid is added to the solvent over time. For example, the acid is preferably added at a rate of 1 ml or smaller per minute to 10 ml of the solvent. Adding the acid slowly to the solvent over time can suppress rapid heat generation. In addition, bubbling can also be suppressed.

Preferably, the first composite powder is immersed in a solution containing the acid for 1 hour or longer. This is because in a case where SiO and $SiO_2$ react quickly with the acid, the dissolving step may be completed before the first composite powder is dissolved. More preferably, the first composite powder is immersed in the solution containing the acid for 48 hours or longer. When 48 hours elapse, the reaction between the acid and the first composite powder is finished. Accordingly, the silicon monoxide and the silicon dioxide covering the surface of the silicon fine particles can be removed more surely.

Next, step S104 is performed. Step S104 is an etching step of immersing the second composite powder into an etching solution containing hydrofluoric acid and an oxidant. Examples of the oxidant include nitric acid ($HNO_3$) and hydrogen peroxide ($H_2O_2$). A slightly polar solvent (for example, 2-propanol) may be mixed with the etching solution to facilitate recovery of the silicon fine particles.

The etching time is adjusted so that a desired emission peak can be obtained. The longer the etching time, the more likely that the emission peak shifts to a shorter wavelength side. The etching is proceeded until a desired emission peak is obtained. At this point, the silicon fine particles are extracted from the etching solution. The extracted silicon fine particles are dried as appropriate, and thereby light-emitting silicon fine particles having a desired emission peak are obtained.

Next, step S105 is performed. Step S105 is a substituting step of substituting a hydrogen atom added to a surface of the silicon fine particles in the etching step with an unsaturated hydrocarbon group having a hydrophilic group.

By steps from S101 to S104, the light-emitting silicon fine particles of the present invention are obtained. Note that when the etching step is performed, hydrofluoric acid used in the etching step causes H atoms to be partially added to the surface of the silicon fine particles in place of the removed silicon oxide (SiOx) which has covered the surface of the silicon fine particles. Accordingly, the silicon fine particles after the etching step are made hydrophobic and are likely to aggregate in an aqueous solution.

For this reason, an unsaturated hydrocarbon group having a hydrophilic group is introduced to the surface of the light-emitting silicon fine particles. In sum, the substituting step is a step of substituting a H atom added to the surface of the silicon fine particles with an unsaturated hydrocarbon group having a hydrophilic group. Specifically, by a hydrosilylation reaction, a H atom of Si—H at an active end of the silicon fine particles is substituted with an unsaturated hydrocarbon group having a hydrophilic group.

The unsaturated hydrocarbon group having a hydrophilic group is a group produced from an isoprenoid compound having a hydrophilic group. For example, monoterpenoids such as linalool can be used. Meanwhile, the unsaturated hydrocarbon group having a hydrophilic group may be a group produced from an allyl compound having a hydrophilic group. For example, allyl alcohol, eugenol, and the like can be used.

Furthermore, the unsaturated hydrocarbon group having a hydrophilic group is preferably a naturally occurring polymer non-harmful to a living body.

In consideration of dispersibility into an organic solvent, a group produced from an isoprenoid compound having a hydrophobic group may be introduced to the surface of the light-emitting silicon fine particles, also. For example, monoterpenoids such as β-pinene can be used.

By substituting a H atom of Si—H at an active end of the silicon fine particles with an unsaturated hydrocarbon group produced from a monoterpenoid having a hydrophobic group, like β-pinene, the dispersibility into an organic solvent can be improved.

(3) Properties of Light-Emitting Silicon Fine Particles

The properties and usage of light-emitting silicon fine particles obtained by the method for producing light-emitting silicon fine particles of the present embodiment are as follow. The average particle diameter is 10 nm or smaller, preferably 1 to 5 nm. The light-emitting silicon fine particles emit color by ultraviolet irradiation.

By making use of the properties of emitting light in the visible region, the light-emitting silicon fine particles can be utilized as, for example, a material of light-emitting elements, particularly, a light-emitting material that can be incorporated into a living body because of an advantage that the light-emitting silicon fine particles are non-harmful to human body.

Besides, for example, the light-emitting silicon fine particles can be used for ultraviolet (UV) filter cosmetics and the like other than a material of light-emitting elements. By subjecting to surface modification, the light-emitting silicon fine particles can be put into a practical use as a light-emitting marker having various functions.

(4) Comparative Evaluation

In order to examine the effects of the present invention, light-emitting silicon fine particles prepared with the dissolving step and light-emitting silicon fine particles prepared without the dissolving step were evaluated.

Figure 8:
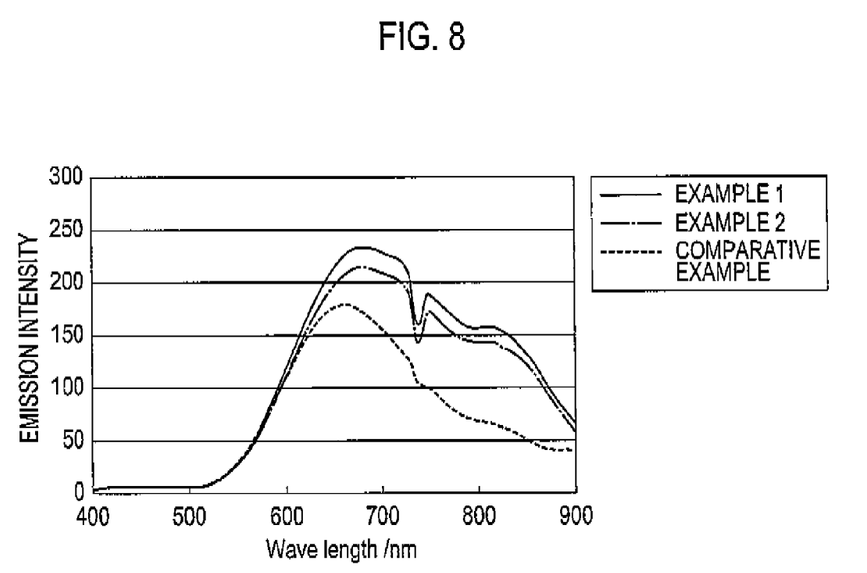
FIG. 8 is a graph showing fluorescence spectra of silicon fine particles according to Examples and Comparative Example.

A mixture solution containing 620 g of ethyl silicate as the silicon source, 288 g of a phenolic resin as the carbon source, and 92 g (35 wt %) of an aqueous solution of maleic acid as the polymerization catalyst was placed in the heating enclosure 2 in FIG. 8. The mixture solution was heated at 150° C. and solidified. Next, the resultant mixture was carbonized in a nitrogen atmosphere at 900° C. for 1 hour. The obtained carbide was heated in an argon atmosphere at 1600° C.

Next, a reaction gas generated in the heating enclosure 2 was transferred to the outside of the heating enclosure 2 using the aspirator 20 and an argon gas as a carrier gas, followed by rapidly cooling to obtain a first composite powder.

Into 10 ml of the solvent (ethanol), 2 g of the obtained first composite powder was immersed. To the solvent in which the first composite powder was immersed, 2 ml of hydrofluoric acid (HF) was added (Example 1). Similarly, 2 g of the first composite powder was immersed into 5 ml of the solvent (ethanol). To the solvent in which the first composite powder was immersed, 5 ml of hydrofluoric acid (HF) was added (Example 2). The solutions to which hydrofluoric acid had been added were left standing for 5 days. Then, each of the solutions was filtered using a 0.1-μm filter. Thereby, a second composite powder was obtained.

Note that the minimum necessary amount of hydrofluoric acid to dissolve all of the equimolar mixture is 10.5 ml, provided that the 2 g first composite powder is an equimolar mixture of silicon monoxide and silicon dioxide.

The etching step was performed on the obtained second composite powders (Examples 1 and 2) and on the first composite powder not subjected to the dissolving step. Ethanol was added to the second composite powders and the first composite powder. Further, 38 wt % of hydrofluoric acid and 68 wt % of nitric acid were added. A supernatant was extracted from each of the solutions, and silicon fine particles were thus obtained. Each of the silicon fine particles was used and irradiated with ultraviolet radiation having a wavelength of 365 nm. FIG. 8 shows the result.

FIG. 8 is a graph showing fluorescence spectra of the silicon fine particles according to Examples and Comparative Example. As shown in FIG. 8, it can be seen that the emission intensities in the range from 600 nm to 900 nm in Examples 1 and 2 are higher than that in Comparative Example. This is presumably because a larger number of the silicon fine particles were obtained in Examples than in Comparative Example.

From the above, the result thus obtained showed that between the light-emitting silicon fine particles subjected to the dissolving step and the light-emitting silicon fine particles not subjected to the dissolving step, the light-emitting silicon fine particles subjected to the dissolving step has a higher emission intensity.

(5) Operations and Effects

The method for producing light-emitting silicon fine particles according to the present embodiment includes: a baking step of baking a mixture containing a silicon source and a carbon source in an inert atmosphere; a rapid cooling step of rapidly cooling a gas generated by baking the mixture to obtain a first composite powder; a dissolving step of dissolving the first composite powder to obtain a second composite powder; and an etching step of immersing the second composite powder into an etching solution containing hydrofluoric acid and an oxidant to obtain silicon fine particles. In the dissolving step, an acid for dissolving silicon monoxide and silicon dioxide is used. The second composite powder contains silicon, silicon monoxide, and silicon dioxide. In the dissolving step, the acid for dissolving silicon monoxide and silicon dioxide is used to dissolve the first composite powder, and thereby the second composite powder is obtained. Thus, the silicon fine particles are not dissolved, but only the silicon monoxide and the silicon dioxide are dissolved. Hence, the size of the silicon fine particles does not change, and the obtained second composite powder contains the dissolved silicon monoxide and silicon dioxide. The second composite powder thus obtained is not covered with the silicon monoxide and the silicon dioxide as much as the first composite powder is. This makes it possible to shorten the etching time for etching the silicon monoxide and the silicon dioxide. Accordingly, the time for controlling the particle size of the silicon fine particles is increased by this shortened time. Furthermore, since the second composite powder is not covered by the silicon monoxide and the silicon dioxide as much as the first composite powder is, it is easier to control the particle size of the silicon fine particles. Thus, silicon fine particles having desired light-emitting properties can be obtained.

The second composite powder has SiOx partially remained at the outer side thereof. This makes it possible to suppress formation of a second composite powder having a particle diameter smaller than the pore size of a filter material. Further, since the particle size of the silicon fine particles can be controlled, it is possible to suppress formation of silicon fine particles having a particle diameter smaller than the pore size of a filter material. Hence, light-emitting silicon fine particles can be obtained in a high yield. Thus, the number of the silicon fine particles to be obtained is increased, and the emission intensity of the silicon fine particles obtained in a single production is higher than that of a conventional technique.

In the method for producing light-emitting silicon fine particles according to the present embodiment, the acid is hydrofluoric acid. Accordingly, the silicon monoxide and the silicon dioxide can be suitably dissolved.

In the method for producing light-emitting silicon fine particles according to the present embodiment, an amount of the acid used in the dissolving step to dissolve a portion of the first composite powder is 1 to 99% of an equivalent amount, where the equivalent amount is a minimum amount of the acid necessary to dissolve all of an equimolar mixture of the silicon monoxide and the silicon dioxide when the first composite powder is assumed to be the equimolar mixture. Accordingly, a portion of the silicon monoxide and a portion of the silicon dioxide contained in the first composite powder are dissolved. Thus, the second composite powder containing silicon, silicon monoxide, and silicon dioxide is obtained. Hence, the second composite powder has a particle diameter larger than the pore size of a filter material, and the yield of silicon fine particles to be obtained can be improved.

In the method for producing light-emitting silicon fine particles according to the present embodiment, in the dissolving step, the first composite powder is immersed into a solvent, and the acid is added to the solvent at a rate of 1 ml per minute. Adding the acid slowly to the solvent over time can suppress rapid heat generation. In addition, bubbling can also be suppressed.

In the method for producing light-emitting silicon fine particles according to the present embodiment, in the dissolving step, the first composite powder is immersed in a solution containing the acid for 1 hour or longer. Accordingly, even if the silicon monoxide and the silicon dioxide react slowly with the acid, portions of the silicon monoxide and the silicon dioxide of the first composite powder can be dissolved more surely.

In the method for producing light-emitting silicon fine particles according to the present embodiment, the oxidant is nitric acid or hydrogen peroxide. Accordingly, the silicon monoxide and the silicon dioxide covering the surface of the silicon fine particles can be etched.

The method for producing light-emitting silicon fine particles according to the present embodiment includes a substituting step of substituting a hydrogen atom added to a surface of the silicon fine particles in the etching step with an unsaturated hydrocarbon group having a hydrophilic group. Accordingly, the H atom partially added to the surface of the silicon fine particles is eliminated, which makes it possible to prevent the silicon fine particles from aggregating in an aqueous solution.

The present invention has been described by way of the embodiment described above. However, it should not be understood that the description and drawings which constitute part of this disclosure limit the present invention. From this disclosure, various alternative embodiments, Examples, and operation techniques will be easily found by those skilled in the art. The present invention includes various embodiments which are not described herein. Accordingly, the technical scope of the present invention should be determined only by the matters to define the invention in the scope of claims regarded as appropriate based on the description.

Note that the entire contents of Japanese Patent Application No. 2010-055670 (filed on Mar. 12, 2010) and Japanese Patent Application No. 2010-088614 (filed on Apr. 7, 2010) are incorporated herein by reference.

INDUSTRIAL APPLICABILITY

As has been described above, since a reduction in the production cost is achieved by effectively utilizing silicon fine particles contained in a composite powder, the method for producing a light-emitting body containing silicon fine particles according to the present invention is useful in the field of producing a light-emitting body containing silicon fine particles. Moreover, the method for producing light-emitting silicon fine particles according to the present invention is capable of producing light-emitting silicon fine particles having desired light-emitting properties in a high yield, and accordingly is useful in the field of producing light-emitting silicon fine particles.

The invention claimed is:

1. A method for producing a light-emitting body containing silicon particles that emit visible light, comprising:
    a baking step of baking a mixture containing a silicon source and a carbon source in an inert atmosphere;
    a cooling step of cooling a gas generated by baking the mixture to obtain a composite powder at a temperature below 1600° C.; and
    a removing step of removing a portion of the composite powder using an acid consisting of hydrofluoric acid, wherein
    in the removing step, a portion of silicon monoxide and a portion of silicon dioxide are removed by only the acid consisting of hydrofluoric acid from the composite powder containing silicon particles, silicon monoxide, and silicon dioxide, and wherein
    the light-emitting body containing silicon particles has an average particle diameter of 1 µm or less.

2. The method for producing a light-emitting body containing silicon particles according to claim 1, wherein
    an amount of the acid used in the removing step is 1 to 99% of an equivalent amount, where the equivalent amount is a minimum necessary amount of the acid to dissolve all of an equimolar mixture of the silicon monoxide and the silicon dioxide when the composite powder is assumed to be the equimolar mixture.

3. The method for producing a light-emitting body containing silicon particles according to claim 1, wherein
    the composite powder is immersed into a solvent, and
    the acid is added to the solvent at a rate of from more than 0 ml per minute to 1 ml per minute.

4. The method for producing a light-emitting body containing silicon particles according to claim 1, wherein, in the removing step, the composite powder is immersed in a solution containing the acid for 1 hour or longer.

5. A method for producing light-emitting silicon particles that emit visible light, comprising:
    a baking step of baking a mixture containing a silicon source and a carbon source in an inert atmosphere;
    a cooling step of cooling a gas generated by baking the mixture to obtain a first composite powder at a temperature below 1600° C.;
    a dissolving step of dissolving the first composite powder to obtain a second composite powder; and
    an etching step of immersing the second composite powder into an etching solution containing hydrofluoric acid and an oxidant to obtain silicon particles, wherein
    in the dissolving step, only an acid consisting of hydrofluoric acid is used, and the second composite powder contains silicon, silicon monoxide, and silicon dioxide, and wherein
    the light-emitting silicon particles have an average particle diameter of 1 µm or less.

6. The method for producing light-emitting silicon particles according to claim 5, wherein
    an amount of the acid used in the dissolving step to dissolve a portion of the first composite powder is 1 to 99% of an equivalent amount, where the equivalent amount is a minimum necessary amount of the acid to dissolve all of an equimolar mixture of the silicon monoxide and the silicon dioxide when the first composite powder is assumed to be the equimolar mixture.

7. The method for producing light-emitting silicon particles according to claim 5, wherein
    in the dissolving step, the first composite powder is immersed into a solvent, and
    the acid is added to the solvent at a rate of from more than 0 ml per minute to 1 ml per minute.

8. The method for producing light-emitting silicon particles according to claim 5, wherein, in the dissolving step, the first composite powder is immersed in a solution containing the acid for 1 hour or longer.

9. The method for producing light-emitting silicon particles according to claim 5, wherein the oxidant is any one of nitric acid and hydrogen peroxide.

10. The method for producing light-emitting silicon particles according to claim 5, comprising a substituting step of substituting a hydrogen atom added to a surface of the silicon particles in the etching step with an unsaturated hydrocarbon group having a hydrophilic group.

* * * * *